Figure 1:
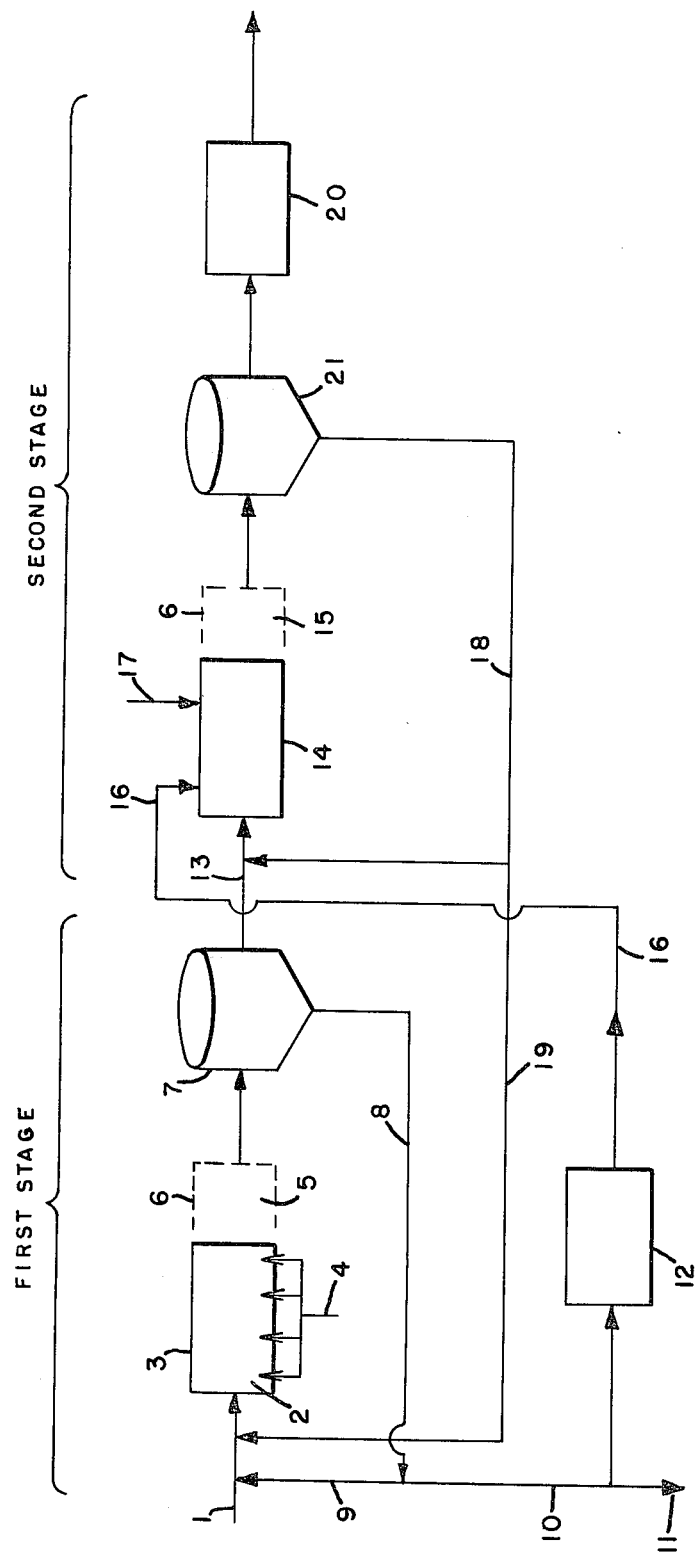

United States Patent [19]
Knopp et al.

[11] 3,957,632
[45] May 18, 1976

[54] WASTE-WATER PURIFICATION
[75] Inventors: Paul V. Knopp, Wausau; Wayne B. Gitchel, Rothschild, both of Wis.
[73] Assignee: Sterling Drug Inc., New York, N.Y.
[22] Filed: Mar. 24, 1972
[21] Appl. No.: 237,894

[52] U.S. Cl. .................................. 210/5; 210/16; 210/18; 210/DIG. 27
[51] Int. Cl.² ...................... C02C 1/06; C02C 5/10
[58] Field of Search ................ 210/6, 16, 18, 39, 5, 210/7, 17, 15, 40, 63, DIG. 27

[56] References Cited
UNITED STATES PATENTS

| 3,244,621 | 4/1966 | Bouthilet | 210/39 X |
| 3,617,540 | 5/1970 | Bishop et al. | 210/16 |
| 3,654,147 | 4/1972 | Levin et al. | 210/18 X |
| 3,767,570 | 10/1973 | Clapp | 210/16 |
| 3,803,029 | 4/1974 | Blecharczyk | 210/16 |
| 3,876,536 | 4/1975 | Prodt et al. | 210/18 |
| 3,904,518 | 9/1975 | Hutton et al. | 210/18 |

OTHER PUBLICATIONS

St. Amant et al., "Treatment of High Nitrate Waters", Jour. AWWA, Dec., 1969, pp. 659–662.

Primary Examiner—Thomas G. Wyse
Attorney, Agent, or Firm—Thomas L. Johnson; B. Woodrow Wyatt

[57] ABSTRACT

A process for purification of waste waters comprising simultaneous treatment with an adsorbent such as powdered activated carbon and oxygen in the presence of activated sludge to effect nitrification, followed by denitrification in the presence of further adsorbent under anaerobic conditions.

6 Claims, 2 Drawing Figures

WASTE-WATER PURIFICATION

This invention relates to the treatment of sewage and other waste-waters to remove organic and inorganic impurities, namely organic carbonaceous materials and organic and inorganic nitrogenous material. More specifically, this invention describes a process for simultaneous biological and physical removal of organic carbonaceous material and biological oxidation of nitrogenous material followed by reduction of the oxidized nitrogenous matrial to elemental nitrogen and subsequent removal of the nitrogen as elemental nitrogen by biological denitrification.

Domestic sewage contains organic and inorganic nitrogenous material as well as carbonaceous material. For example, a typical raw sewage contains approximately 250 mg/l five day biological oxygen demand ($BOD_5$), and 40 mg/l total Kjeldahl nitrogen (TKN) of which approximately 30 mg/l is in the ammoniacal form ($NH_3$ or $NH_4^+$). Conventional primary sedimentation will reduce the $BOD_5$ and TKN to about 175 mg/l and 32 mg/l, respectively. Subsequent aerobic biological treatment by, for example, activated sludge under suitable operating conditions oxidizes the ammoniacal nitrogen to nitrite and nitrate nitrogen as well as substantially reducing the $BOD_5$. Subsequent treatment in a stage containing heterotrophic bacteria where no oxygen is added (anaerobic conditions) and sufficient organic carbon is present results in reduction of nitrate nitrogen to elemental nitrogen which is given off in gaseous form.

Organisms responsible for oxidation of carbonaceous organic material are ubiquitous and are generally considered to be largely heterotrophic organisms such as zooglea, pseudomonas and chromobacterium which require organic carbon as a food and energy source. Organisms responsible for nitrification are classed as chemotrophic because of their ability to fix inorganic carbon ($CO_2$) as their carbon source. Nitrosomonas and nitrobacter are representative of the group responsible for nitrification. Denitrification is accomplished by facultative organisms capable of utilizing the oxygen in the nitrate. Schematically the various transformations are represented as follows:

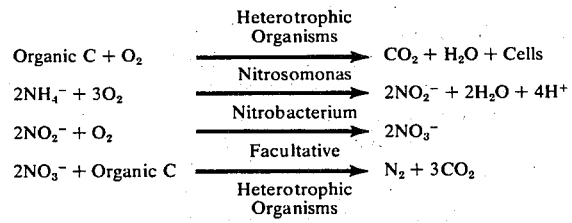

In conventional biological nitrification and denitrification systems the growth rate of the organisms responsible for nitrification is much slower than the heterotrophic organisms. Thus long cell residence times are required to maintain a viable nitrifying mass in order to prevent washing out of nitrifiers either in the effluent or in the wasted sludge. In conventional activated sludge it is difficult to maintain high concentrations of biological solids. Therefore, long hydraulic residence times are required. The volumetric residence time required can be substantially reduced if the mass of nitrifying organisms in the system can be increased. This is difficult to do by conventional methods of operation. The principles governing the above phenomenon are described in a paper by Downing et al. (J. Inst. Sew. Purif., 1961, p. 130).

Denitrification is not only dependent upon the mass of denitrifying organisms present in the system, but also on the availability of organic carbon to provide energy and to act as electron donor or oxygen acceptor in the denitrification step. In practice the denitrification rate is accelerated by providing an organic carbon source, such as methanol, to maintain the denitrification rate at a high level.

Accordingly, it is the object of this invention to provide a method for simultaneously removing organic carbonaceous material and nitrogenous material from sewage under improved conditions so as to accelerate the rate of oxidation of nitrogen.

A further objective of the invention is to accelerate the rate of denitrification by providing improved conditions for increasing the denitrification rate in the denitrification step.

A still further objective of the invention is to improve the removal of organic carbonaceous material by physical adsorption.

Another objective of the invention is to reduce the susceptibility of the treatment system to variation in the flow and composition of the influent sewage.

In accordance with this invention waste-water containing organic biodegradable and adsorbable carbonaceous material and organic and ammoniacal nitrogen is subjected to simultaneous physical adsorption and biologicl oxidation to remove organic carbonaceous material and oxidize the ammoniacal nitrogenous material to nitrate nitrogen. The waste stream is subsequently exposed to a second stage of treatment in which further adsorption occurs under anaerobic conditions biologically reducing the previously oxidized nitrogenous material to elemental nitrogen thereby simultaneously accomplishing both nitrogen removal and organic carbon removal. Carbon from the second stage treatment is transferred upstream to the first stage for further contact countercurrently to adsorb additional organic carbonaceous material. Spent carbon and associated organics are removed from the first stage and the carbon regenerated or disposed of.

It has been found that a waste-water stream containing up to about 100 mg/l ammonia nitrogen and containing organic carbon up to about 2000 mg/l as measured by chemical oxygen demand (COD) can be treated in an integrated physical/biological waste treatment system to produce water substantially free of organic material and nitrogen concentrations suitable for meeting standards for discharge into natural waters.

Normal practice in oxidizing nitrogen and removal of $BOD_5$ requires at least eight hours of aeration to accomplish appreciable $BOD_5$ removal and nitrogen oxidation. This constraint is largely due to the inability to maintain a large mass of active nitrifying organisms in the system. It has been found that the addition of large amounts of biologically inert suspended adsorbent to the system and maintaining the concentration of these suspended materials at a high level permits the accumulation of very large masses of active nitrifying organisms in the sewage solid mixture thereby improving the overall rate of nitrification.

Organic constituents which are not removed biologically are largely removed by the action of an adsorbent substance. The latter can be any biologically inert, essentially water insoluble solid of large surface area. Such solids include activated carbon, various forms of clay, fly ash and the like. A preferred adsorbent is powdered activated carbon.

It has still further been found that by the introduction of an adsorbent, preferably powdered activated carbon, in countercurrent relationship to the flow in a two-stage system permits the reduction or denitrification of oxidized nitrogen in the second stage to elemental gaseous nitrogen while at the same time accomplishing greater removals of organic carbonaceous material. In conventional denitrification the addition of organic carbon such as methanol is required to increase the rate of denitrification. By maintaining a high solids content in the denitrification system it is possible to reduce the quantity of supplemental organic carbon required.

The nitrification part or first stage of the process of the invention is carried out by introducing an aqueous suspension of an adsorbent capable of adsorbing organic carbonaceous material simultaneously with the addition of a noncondensible oxygen-containing gas into a vessel containing waste-water and a developing active biomass having a sludge age of at least about three days, and maintaining aerobic conditions for a length of time sufficient to substantially oxidize the ammoniacal nitrogen to nitrite or nitrate nitrogen. The mixture is passed to a settling zone where the adsorbent, associated adsorbed organic material and biological solids are separated and returned to the inlet end of the system. From time to time as the concentration of solids increases, solids are removed for subsequent disposal or regeneration at such a rate as to maintain an approximate materials balance.

The oxygen-containing gas can be pure oxygen or oxygen mixture with inert gases, e.g., ordinary air, added in amount depending upon the concentration of BOD. Normally, air or oxygen is added at such a rate to provide a transfer of at least 0.1 pound of oxygen per thousand gallons of waste-water processed.

The sludge age is the average residence time of the biomass in the system. This is readily calculated from the ratio of the total biological solids in contact per day to the biological solids removed per day in the supernatant effluent or spent slurry, as shown in the examples below. A sludge age of at least about three days is needed to preserve a population of nitrifying bacteria large enough to effect adequate nitrification.

As indicated above conventional nitrification requires a contact time of at least eight hours. It has been found that the process of this invention allows the contact time to be reduced to as low as one hour. A preferred time range is from three to six hours.

In the nitrification stage, the adsorbent, when powdered activated carbon, is present to the extent of between 40 and 90% by weight of the total suspended solids. The total suspended solids include the activated carbon, adsorbed solids and biological solids.

The dentrification part or second stage of the process of the invention is carried out by passing the supernatant or liquid phase product from the first stage to an anaerobic zone to which further adsorbent and a source of organic carbon is added. The nitrate ions are thereupon reduced to elementary nitrogen which escapes as a gas. The contact time in the denitrification stage can be as short as one hour, with a preferred time range of three to six hours. Finally, the mixture is passed to a quiescent zone where the adsorbent and associated organic material are allowed to settle and are optionally recycled to the inlet ends of the first or second stages.

In the denitrification stage the adsorbent, when powdered activated carbon, is present to the extent of between 40 and 90% by weight of the total suspended solids.

The nature of the source of organic carbon in the denitrification stage is immaterial, although economic considerations dictate that it be readily available and inexpensive. A conventional organic carbon source is methanol. Additional economically feasible sources of organic carbon are derived from the soluble BOD still present in or added to the waste-water. Thus, residual BOD is present in the spent carbon slurry emanating from the first stage, or may be added in the form of the supernatant derived from the dewatering of thermally conditioned sludge obtained from primary sedimentation of sewage. These additional sources of BOD reduce the amount of methanol required. The quantity of methanol added is preferably kept in the range of about 2 to 10 mg. per mg. of nitrate nitrogen to be reduced, so that the methanol is essentially completely consumed and no appreciable amount of it passes through in the final product water.

The adsorbent and associated adsorbed organic material separated in the settling zone subsequent to denitrification are preferably recycled to the second (denitrification) or first (nitrification) stages or both. In the event of recycle to the first stage it is preferred to transfer the material to the aerobic zone at a rate approximately equal to the rate of accumulation of solids in the anaerobic zone.

In order to maintain a proper materials balance throughout the whole system, the quantity of total solids removed from the first stage for disposal or regeneration is approximately equal to the amount of solids added from the second stage plus the weight equivalent of soluble solids adsorbed and biomass produced in the first stage. The amount of total solids removed from the second stage and transferred to the first stage is approximately equivalent to the amount of solids added as virgin or regenerated adsorbent to the second stage plus the amount of soluble organic adsorbed and biomass produced in the second stage.

The quantity of solids maintained in the first stage will vary depending upon the quantity of biological oxygen demanding material in the sewage and more specifically on the desired sludge age for nitrification. The quantity of solids maintained in the second stage contactor will depend upon the concentration of nitrate in the interstage waste-water.

The Figures show two embodiments of the process.

Referring to FIG. 1 of the drawings, chemically treated or primary effluent sewage 1 is mixed with a biologically inert suspended adsorbent material 3 in a first-stage contacting chamber 2 which is mixed with air or other oxygen-containing gas 4. After a contact time of at least one hour, the mixture is passed to an optional flocculation zone 5 where a polyelectrolyte 6 may be added. The mixture then passes to a settling basin of conventional design 7. The settled material 8 is recycled to the inlet end of the step to mix again with the incoming sewage 1. After contact in the first stage the settled treated sewage effluent 13 is passed to a second stage of contacting in which additional biologically inert suspended adsorbent 16 is contacted with the sewage in a contactor 14 mixed mechanically under anaerobic conditions. Methanol or other suitable organic carbon source 17 is added to the second stage to stimulate denitrification. The denitrified waste-water then passes to an optional flocculation zone 15 and is separated in a settling tank 21, and the settled solids 18 are returned to the inlet end of this stage. A small amount of solids 19 is removed from the second stage and mixed with the raw sewage 1 of the first stage. An optional filtration step 20 is provided to polish the effluent to remove fine particulate carbon matter which may be carried over from the separation step 21.

Regeneration of the adsorbent in the system is accomplished by continuously removing a portion of the solids in the first stage 10 and regenerating the solids in a regenerating system 12 for return to the system 9 or 16. Alternatively, the removed solids can be disposed of 11.

Figure 2:
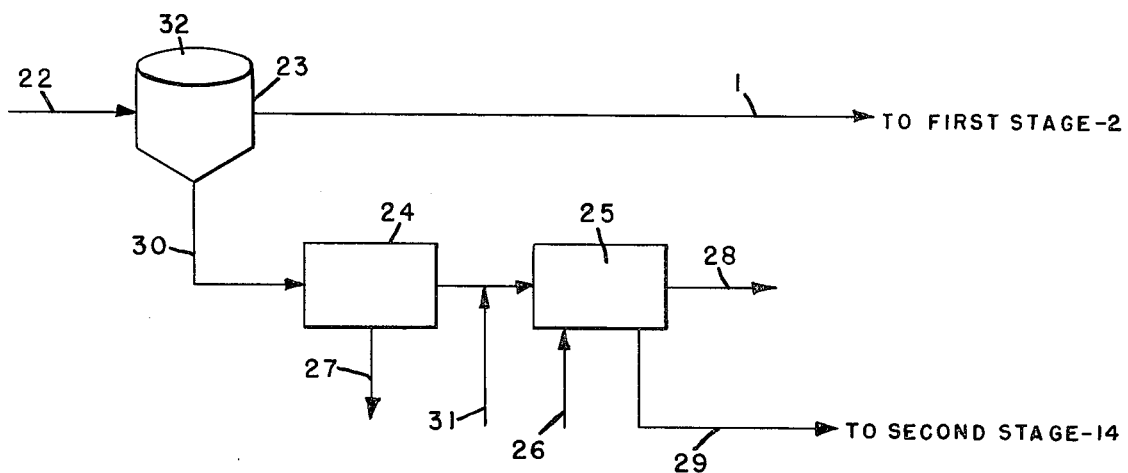

In a variation shown in FIG. 2 the raw sewage is first subjected to primary sedimentation prior to carbon contact and nitrification and denitrification. Sludge produced in the primary step 30 is conditioned for dewatering 24 by thermal conditioning or wet air oxidation as taught in U.S. Pat. No. 3,359,200. After the sludge is dewatered 24 and removed 27 the pH of the liquid phase is adjusted with lime 31 and passed to a zone to permit stripping of the ammoniacal nitrogen 28 with air 26. The liquid now free of ammoniacal nitrogen is then fed to the denitrification step 14 to provide organic biodegradable carbon to enhance the rate of denitrification.

IN a further variation shown in FIG. 2 lime or other caustic substance 32 may be added in the primary treatment step to precipitate phosphorus and further improve sedimentation. The lime slurry 30 may then be subjected to thermal conditioning and dewatering 24. The liquid phase 31 is then stripped of ammonia 28 with air 26 to remove ammoniacal nitrogen. The resultant liquor 29 is then fed to the denitrification system 14 to enhance the rate of denitrification and reduce the supplemental carbon 17 required.

In a still further variation a precipitating chemical such as source of ferric or aluminum ions may be added to the raw sewage to improve precipitation and remove phosphorus.

The following examples will further illustrate the invention without the latter being limited thereby.

EXAMPLE 1

Nitrification of Sewage

A raw sewage of the following composition is treated in a single stage carbon contact system as previously described:

|  | Sewage | Product Water |
|---|---|---|
| COD | 300 mg/l | 20 mg/l |
| BOD | 150 mg/l | 5 mg/l |
| NH$_3$-N | 30 mg/l | 3 mg/l |
| Organic N | 2 mg/l | 2 mg/l |

The total oxygen demand including the nitrogenous demand is 2,211 pounds of oxygen. The total suspended solids maintained in the contactor is 20,000 mg/l. The contact time is three hours and the settling time is approximately one and one-half hours. Internal recycling of suspended material is maintained.

The following table summarizes the performance parameters for these examples:

| | |
|---|---|
| Temperature | 20°C |
| Carbon Feed Rate, mg/l | 400 |
| pounds/day | 3,340 |
| BOD$_5$ Removed, pounds/day | 1,210 |
| COD Adsorbed, pounds/day | 1,124 |
| Solids Equivalent COD | 625 |
| Waste Temperature | 20°C |
| Total Suspended Solids Under Contact, mg/l | 20,000 |
| pounds | 20,850 |
| Carbon in Contact, pounds | 15,057 |
| Adsorbed Solids in Contact, pounds | 2,825 |
| Biological Solids in Contact, pounds | 2,968 |
| Total Suspended Solids in Spent Slurry | 4,622 |
| Carbon in Spent Slurry, pounds/day | 3,340 |
| Adsorbed Solids in Spent Slurry, pounds/day | 625 |
| Biological Solids in Spent Slurry, pounds/day | 657 |
| Sludge Age, days | 4.52 |

Thus in a short contact period of three hours it is possible to maintain a sludge age in excess of that required for complete conversion of the ammonia nitrogen to nitrate nitrogen, while at the same time providing a high degree of organic carbon removal.

EXAMPLE 2

Effect of the Addition of an Adsorbent on Sludge Age of the Biological Solids

It is well known that the activated sludge process is difficult to control largely because of the dominant effects of the biological mass on the settling properties of the sludge. Mixed liquor concentrations of 3,000 mg/l volatile suspended solids (VSS) are often as high as can be practically used, and on many wastes it is difficult to maintain 2,000 mg/l VSS. For short hydraulic residence times it is often difficult to maintain 1,500 mg/l VSS. This example serves to illustrate how the addition of the adsorbent can allow operation with sludge ages and effective volatile solids concentration higher than are normally possible in the activated sludge process.

A primary effluent sewage containing 300 mg/l and 150 mg/l COD and BOD, respectively, is treated in a single stage carbon contacting system with a two hour contact time. The contactor is mixed by aeration such that at least 50 pounds per hour oxygen is transferred to the carbon slurry. The slurry solids concentration in the contactor is maintained at 10,000, 20,000 and 40,000 mg/l respectively for the three examples shown below for the treatment of one million gallons of sewage. The net yield of biological solids is based on an equation developed by Eckenfelder ("A Design Procedure for Biological Nitrification and Denitrification", Chem. Eng. Prog. Symp. Ser. 63(78), 230–4, 1967) in which the yield of biological solids expressed as pounds of volatile suspended solids per day ($\Delta X_v$) is:

$$\Delta X_v = 0.73 S_r - 0.075 X_v$$

where:

$S_r$ = Pounds of BOD removed per day
$X_v$ = Pounds of biomass under contact.

At steady state the ratio of biomass to total solids in the waste sludge must be the same as the ratio of biomass to total solids in the contact tank. That is:

$$X_v = \left\{ \frac{\Delta X_v}{\Delta X_v + X_c + X_a} \right\} X_t$$

where:

$X_c$ = Weight of carbon fed per day
$X_a$ = Weight equivalent of COD adsorbed on the carbon per day
$X_t$ = Total weight of solids under aeration.

Substituting (2) into equation (1) and rearranging yields:

$$\Delta X_r^2 + (X_c + X_a - 0.73 S_r + 0.075 X_t)\Delta X_r - 0.73 S_r(X_c + X_a) = 0$$

or $$\Delta X_r = \frac{-B \pm \sqrt{B^2 + 4AC}}{2A}$$

where:
$B = X_c + X_a - 0.73 S_r + 0.075 X_t$
$C = 0.73 S_r(X_c + X_a)$
$A = 1$.

Solution of this equation along with other parameters for the examples are shown in the following table:

| | | | |
|---|---|---|---|
| Hours of Contact | 2 | | |
| Carbon Feed Rate, mg/l | 400 | | |
| pounds/day | 3,340 | | |
| BOD$_5$ Removed, pounds/day | 1,208 | | |
| COD Adsorbed, pounds/day O$_2$ Equivalent | 1,124 | | |
| pounds/day Solids Equivalent | 625 | | |
| Total Suspended Solids Under Contact, mg/l | 10,000 | 20,000 | 40,000 |
| Composition of Spent Solids | | | |
| Spent Carbon, pounds/day | 3,340 | 3,340 | 3,340 |
| Adsorbed COD, pounds/day | 625 | 625 | 625 |
| Biological Solids, pounds/day | 798 | 722 | 605 |
| Total | 4,763 | 4,687 | 4,570 |
| Composition of Solids Under Contact | | | |
| Carbon Solids, pounds | 4,870 | 9,900 | 20,300 |
| Adsorbed Solids, pounds | 912 | 1,853 | 3,800 |
| Biological Solids, pounds | 1,165 | 2,140 | 3,600 |
| Total | 6,947 | 13,893 | 27,700 |
| Sludge Age, days | 1.46 | 2.97 | 5.95 |
| Sludge Age Required for Nitrification | | 3.0 days | |

EXAMPLE 3

Nitrification-Denitrification in a Two-Stage Countercurrent System

A raw sewage similar in composition to the previous example is treated in a two-stage countercurrent contact process in which organic material is adsorbed in both stages and ammonia nitrogen is biologically oxidized in the first stage to nitrate nitrogen and the nitrate nitrogen is subsequently reduced biologically to elemental nitrogen in the second stage.

In this case, becase of countercurrent contact a reduced dose (300 mg/l) of carbon is required for removal of adsorbable non-biodegradable COD. The effective overall carbon loading is 0.45 gm COD adsorbed per gram of carbon fed. The following illustrates the performance parameters for this system.

| | |
|---|---|
| Temperature | 20°C |
| Carbon Feed Rate, mg/l | 300 |
| pounds/day | 2,500 |
| Nitrification Stage | |
| Contact Time, hours | 3.0 |
| BOD$_5$ Removed, pounds | 1,208 |
| COD Adsorbed O$_2$ Equivalent, pounds | 1,124 |
| Solids Equivalent COD, pounds | 625 |
| Total Oxygen Requirements, pounds | 2,245 |
| Total Suspended Solids Under Contact, mg/l | 20,000 |
| pounds | 20,855 |
| Carbon in Contact, pounds | 13,900 |
| Adsorbed Solids in Contact, pounds | 3,475 |

-continued

| | |
|---|---|
| Biological Solids in Contact, pounds | 3,480 |
| Total Suspended Solids in Spent Slurry, pounds | 3,751 |
| Carbon in Spent Slurry, pounds/day | 2,500 |
| Adsorbed Solids in Spent Slurry, pounds/day | 625 |
| Biological Solids in Spent Slurry, pounds/day | 626 |
| Sludge Age, days | 5.57 |
| Denitrification Stage | |
| NO$_3$-N, in Feed, | 28 mg/l |
| Carbon Feed | 300 mg/l |
| Pounds NO$_3$-N Removed, O$_2$ Equivalent | 800 |
| Methanol Requirements, pounds | 533 |
| Total Suspended Solids Under Contact, mg/l | 20,000 |
| pounds | 20,850 |
| Carbon in Contact, pounds | 19,020 |
| Adsorbed Solids in Contact, pounds | 887 |
| Biological Solids in Contact, pounds | 943 |
| Total Suspended Solids in Spent Slurry, pounds/day | 2,740 |
| Carbon in Spent Slurry, pounds/day | 2,500 |
| Adsorbed Organics in Spent Slurry, pounds/day | 116 |
| Biological Solids in Spent Slurry, pounds/day | 124 |

Thus the sludge age in the nitrification step of the process is 5.57 days, sufficiently in excess of the 3.0 days required for complete nitrification.

By controlling the concentration of the solids under contact in each stage it is possible to control the sludge age in each stage independent susceptable the other.

From the example shown it is also apparent that because of the large mass of carbon maintained in the system, the system is less suscetible to variation in influent concentration. For example, as the concentration of adsorbable material rises, such as might occur in the usual diurnal variation pattern in domestic sewage, more organics are adsorbed onto the carbon, which when the concentration of the incoming sewage falls, are desorbed back ito the liquid phase.

Thus the adsorbent provides inertia to changes in the concentration of dissolved organics, modulating the influence of these changes on the biological mass in the system.

EXAMPLE 4

In the previous example, 300 mg/l activated carbon is fed to the denitrification stage of the system. Previously used activated cabon, regenerated by partial wet air oxidation can be used as taught in U.S Pat. No. 3,359,200. In this instance, soluble BOD in the amount of three to five percent by weight of carbon solids is contained in the carbon slurry fed. This soluble BOD can be substituted for an equivalent amount of methanol to provide an organic carbon source in the denitrification step. Thus the addition of 15 mg/l soluble BOD contained in the carbon slurry will provide for the reduction by 15 mg/l in the amount of methanol required to maintain denitrification or a savings of 23 percent in the quantity of methanol required.

EXAMPLE 5

A raw sewage is settled in a primary treatment plant typically yielding approximately 2,000 gallons of sludge of the following composition:

| | |
|---|---|
| Total Suspended Solids | 833 pounds |
| Total Volatile Solids | 694 pounds |
| Total Nitrogen | 82 pounds |

The sludge is processed by wet air oxidation resulting in a 50 percent oxidation and 30 percent solubilization of the volatile solids. The sludge solids are separated from the liquid phase resulting in 2,000 gallons of supernatant containing the following constituents:

| | |
|---|---|
| Volatile Solids | 208 pounds |
| COD | 374 pounds |
| BOD | 184 pounds |
| Nitrogen-NH$_4^+$ | 58 pounds |

The supernatant is then treated with a basic material such as lime or caustic to a pH in excess of 8.0 and air or other gas is used to strip off the ammonia nitrogen contained in the supernatant. The supernatant can then be fed directly to the denitrification stage to enhance denitrification. The quantity of methanol fed to the denitrification stage can then be reduced by an amount approximately equivalent to the biological oxygen demand contained in the supernatant liquid which for this example is a 34 percent reduction in the amount of methanol required.

We claim:

1. The process of simultaneous removal of organic carbonaceous material and biological oxidation of the reduced nitrogenous forms in waste-waters followed by subsequent reduction of the oxidized nitrogen to elemental nitrogen which comprises the steps of:
   a. feeding waste-water containing ammoniacal nitrogen into a vessel containing a developing active biomass having a sludge age of at least about three days to which vessel is introduced an aqueous suspension of powdered activated carbon simultaneously with the addition of a non-condensible oxygen containing gas;
   b. maintaining aerobic conditions for at least one hour to substantially oxidize ammoniacal nitrogen to nitrite or nitrate nitrogen;
   c. settling and separating the powdered activated carbon, associated adsorbed organic material and biological solids and returning the separated solids to the inlet end;
   d. passing the liquid phase from part (c) to an anaerobic zone containing denitrifying organisms to which further powdered activated carbon and a source of organic carbon is added whereby the oxidized nitrogen forms are reduced to elemental nitrogen and solids accumulate;
   e. passing the mixture from part (d) to a quiescent zone where the powdered activated carbon and associated organic material are substantially removed from the waste-water; and
   f. removing the effluent from the quiescent zone.

2. The process according to claim 1, wherein in step (a) the powdered activated carbon is present to the extent of between 40 and 90% by weight of the total suspended solids.

3. The process according to claim 1, wherein in step (d) the powdered activated carbon is present to the extent of between 40 and 90% by weight of the total suspended solids.

4. The process according to claim 1, wherein in step (d) the source of organic carbon is methanol added in the amount of between about 2 and 10 mg. per mg. of nitrate nitrogen reduced.

5. The process according to claim 1, wherein the adsorbent and adsorbed organic material are transferred from step (e) to the aerobic zone of step (b), approximately at the rate of accumulation of solids in step (d).

6. The process according to claim 1, wherein a portion of the solids separated in step (c) is removed for subsequent disposal or regeneration at such a rate as to maintain an approximate materials balance.

* * * * *

UNITED STATES PATENT AND TRADEMARK OFFICE
CERTIFICATE OF CORRECTION

PATENT NO. : 3,957,632
DATED : May 18, 1976
INVENTOR(S) : Paul V. Knopp & Wayne B. Gitchel It is certified that error appears in the above-identified patent and that said Letters Patent are hereby corrected as shown below:

Cover page, 2nd column, line 2, "Prodt" should read --Pradt--.

Column 4, line 63, after "recycled" insert --9--.

Column 5, line 18, after "sewage" insert --22--; line 19, after "sedimentation" insert --23--; line 26, after "zone" insert --25--.

Column 7, line 18, "$C = 0.73S_r(X_c + x_a)$" should read --$C = 0.73S_r(X_c + X_a)$--.

Column 8, line 29, delete "susceptable" and insert in place thereof --of--.

Signed and Sealed this

Seventh Day of September 1976

[SEAL]

Attest:

RUTH C. MASON
Attesting Officer

C. MARSHALL DANN
Commissioner of Patents and Trademarks